(12) United States Patent
Desard

(10) Patent No.: US 11,817,685 B2
(45) Date of Patent: Nov. 14, 2023

(54) CABLE STRAND ANCHORING DEVICES AND ASSEMBLIES

(71) Applicant: Corning Research & Development Corporation, Corning, NY (US)

(72) Inventor: Christophe Desard, Herbignac (FR)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/488,371

(22) Filed: Sep. 29, 2021

(65) Prior Publication Data
US 2022/0109291 A1    Apr. 7, 2022

Related U.S. Application Data

(60) Provisional application No. 63/088,594, filed on Oct. 7, 2020.

(51) Int. Cl.
*H02G 3/04* (2006.01)
*G02B 6/44* (2006.01)
*F16L 3/10* (2006.01)

(52) U.S. Cl.
CPC .............. *H02G 3/0456* (2013.01); *F16L 3/10* (2013.01); *G02B 6/4432* (2013.01)

(58) Field of Classification Search
CPC ........ F16L 3/10; H02G 3/0456; G02B 6/4432
See application file for complete search history.

(56) References Cited

U.S. PATENT DOCUMENTS

| | | | |
|---|---|---|---|
| 3,667,783 A * | 6/1972 | Sotolongo | H02G 3/065 |
| | | | 285/341 |
| 4,070,085 A * | 1/1978 | Nelson | H01R 13/512 |
| | | | 439/690 |
| 4,114,974 A * | 9/1978 | Lawrence | H01R 13/5205 |
| | | | 439/462 |
| 5,013,124 A | 5/1991 | Focht | |
| 5,211,576 A * | 5/1993 | Tonkiss | H01R 13/59 |
| | | | 439/462 |
| 5,374,017 A * | 12/1994 | Martin | F16L 5/00 |
| | | | 174/153 G |
| 6,149,455 A * | 11/2000 | Levi | H01R 13/59 |
| | | | 439/321 |
| 9,343,890 B2 * | 5/2016 | Pelletier | H02G 3/0658 |
| 2018/0055550 A1 | 3/2018 | Bryant et al. | |
| 2020/0057221 A1 | 2/2020 | Desard | |

FOREIGN PATENT DOCUMENTS

EP    0921604 A1 *    6/1999

OTHER PUBLICATIONS

European Patent Application No. 21200706.6, European Search Report, dated Mar. 7, 2022; 9 pages, European Patent Office.

* cited by examiner

*Primary Examiner* — Monica E Millner
(74) *Attorney, Agent, or Firm* — Tamika A. Crawl-Bey

(57) ABSTRACT

Cable strand anchoring devices include a hub extending from a first hub end to a second hub end; a plurality of cable strand positioning elements, extending from the hub. Each cable positioning element comprises a stabilizing portion monolithically formed with the hub, an arc portion monolithically formed with the stabilizing portion, and a lobe monolithically formed with the hub, the stabilizing portion and the arc portion. In addition, the cable strand anchoring device can include a plurality of strand anchors monolithically formed with the hub and the lobe.

12 Claims, 6 Drawing Sheets

CABLE STRAND ANCHORING DEVICES AND ASSEMBLIES

CROSS-REFERENCE TO RELATED APPLICATIONS

This application claims the benefit of priority under 35 U.S.C. § 119 of U.S. Provisional Application Ser. No. 63/088,594, filed Oct. 7, 2020, the content of which is relied upon and incorporated herein by reference in its entirety.

BACKGROUND

The present disclosure relates to devices used to anchor strands of telecommunications cables to telecommunications enclosures and/or components configured for connection to telecommunications enclosures.

Telecommunications systems use a network of telecommunications cables to transmit large volumes of data and voice signals over long distances. Telecommunications cables can include fiber optic cables, electrical cables, or combinations of electrical and fiber optic cables. Telecommunications systems also include a plurality of telecommunications enclosures integrated throughout the network of telecommunications cables. The telecommunications enclosures, often referred to in the industry as "closures," are adapted to contain and protect telecommunications components such as splices, termination panels, power splitters, wave division multiplexers, fiber management trays, cable organizing and routing components, etc.

Typically, cables entering telecommunications enclosures must be fixed in place inside the enclosure. Within the closure, and depending on the type of cable, protective components of the cable, such as a jacket, a buffer tube, strength members, etc., are stripped, truncated, or removed, allowing strands and/or portions of the cable to be managed within the closure.

Typically, fixing and un-fixing cables to/from the interior of a closure is a cumbersome and time-consuming process. In addition, portions of cable fixation assemblies are often not interchangeable, with the assemblies being designed exclusively for a particular cable type, a particular closure type, and the like. As such, current solutions can be ineffective. Some solutions, for example positions strands and/or other portions of the cable within a closure component itself. Another typical solution merely uses a cable tie to hold strands and/or portions of the cable in place. Each of these solutions has disadvantages.

Consequently, there are several needs for improved devices that facilitate connection or coupling of strands and/or other portions of cables to telecommunications enclosures. The embodiments disclosed herein fulfill these needs and provide further related advantages, as will be apparent from the following description and claims.

SUMMARY

In accordance with certain embodiments of the present disclosure, objectives of the cable strand anchoring devices disclosed herein include providing anchorage means, particularly for cables that include various types of strands, threads, fibers, or yarns or the like, which are capable of being plaited or twisted together. For fiber optic cables, such strands typically include aramid yarns, which are frequently used as stranded strength members.

According to one aspect of the present disclosure, a cable strand anchoring device includes a hub extending from a first hub end to a second hub end; a plurality of cable strand positioning elements, extending from the hub. Each cable positioning element comprises a stabilizing portion monolithically formed with the hub, an arc portion monolithically formed with the stabilizing portion, and a lobe monolithically formed with the hub, the stabilizing portion and the arc portion. In addition, the cable strand anchoring device can include a plurality of strand anchors monolithically formed with the hub and the lobe, According to another aspect of the present disclosure, the cable strand anchoring device can be combined with a modular component, used for assembly with a telecommunications enclosure, to form a cable strand anchoring assembly. As such, the cable strand anchoring assembly is operatively attachable to a telecommunications enclosure. The modular component preferably includes a fastening feature that facilitates attachment to a telecommunications enclosure and gripping features that facilitate hand gripping of the modular component.

Additional objectives, aspects, features and advantages of the present disclosures will be apparent from the detailed description which follows, and will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Various exemplary embodiments of the disclosure will now be described with particular reference to the drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the features and limitations set forth in the claims and any equivalents thereof.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Cartesian coordinates are used in some of the Figures for reference and are not intended to be limiting as to direction or orientation.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

For the purposes of describing and defining the subject matter of the disclosure it is noted that the terms "substantially" and "generally" may be utilized herein to represent the inherent degree of uncertainty that may be attributed to any quantitative comparison, value, measurement, or other representation.

Figure 1:
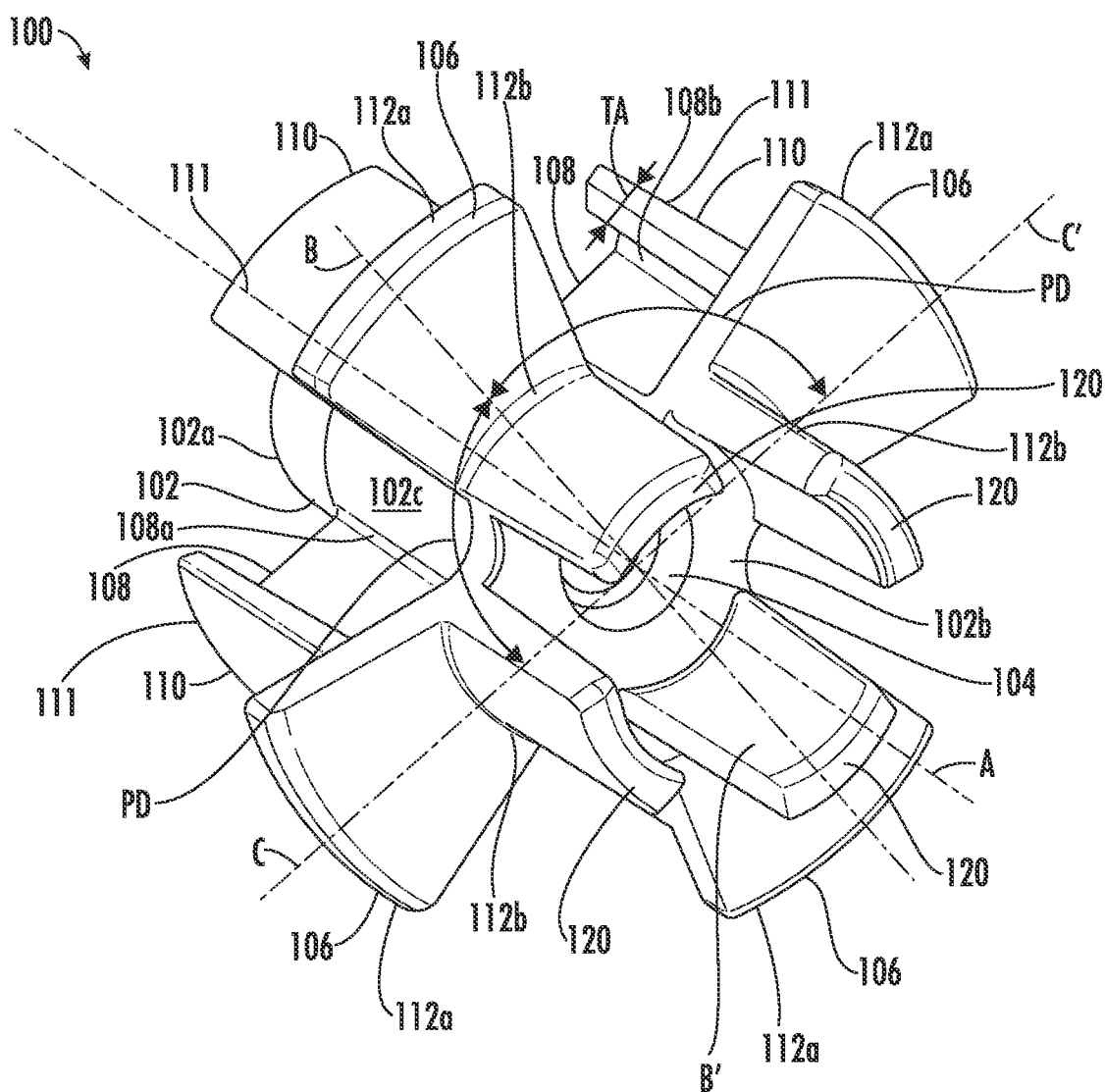
FIG. 1 is an isometric view of a cable strand anchoring device in accordance with embodiments disclosed herein.

FIG. 1 illustrates a cable strand anchoring device 100 configured for coupling to a telecommunications enclosure and/or one or more components of a telecommunications enclosure. The cable strand anchoring device 100 includes a hub 102, extending from a first hub end 102a to a second hub end 102b. In this embodiment, a thru-hole 104 is also defined within the hub 102 to extend from the first hub end 102a to the second hub end 102b. The thru-hole 104 is configured for routing of at least one cable strand. However, alternatively or in addition, one or more cable strands may be routed around the hub exterior 102e. The thru-hole 104 may also be configured for assembly with a fastening element, as will be described with respect to FIGS. 3 and 4.

Figure 2:
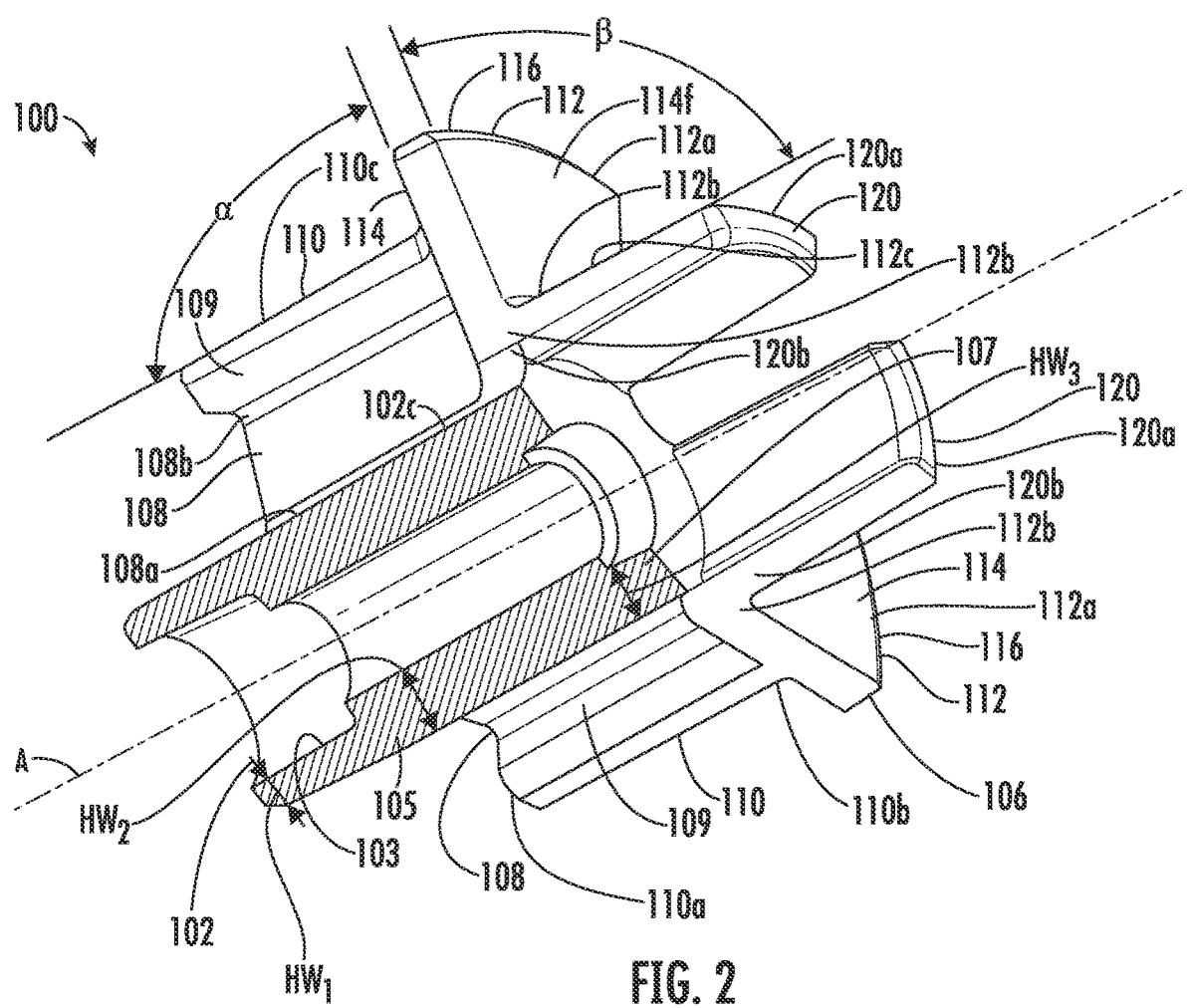
FIG. 2 is a cross-sectional view of the cable strand anchoring device, shown in FIG. 1, in accordance with embodiments disclosed herein.

Referring particularly to FIG. 2, the hub 102 is further defined by a plurality of hub walls, specifically a first hub wall 103, a second hub wall 105, and a third hub wall 107. Each hub wall has respective hub wall thicknesses HW1, HW2, HW3, where the second hub wall thickness HW2 is larger than the third hub wall thickness HW3, and where the third hub wall thickness HW3 is larger than the first hub wall thickness HW1.

Extending outwardly from the hub 102 and specifically the hub exterior 102e is a plurality of cable strand positioning elements 106. Each cable strand positioning element 106 is positioned symmetrically in a radial arrangement with respect to a longitudinal axis A, which extends through the center of the cable anchoring device. In the arrangement shown in FIG. 1, there are four cable strand positioning elements which are positioned symmetrically in a radial arrangement. Specifically, each cable strand positioning element has a central axis B, B', C, C' positioned a predetermined angular distance PD with respect to each other. Preferably, the predetermined angular distance PD is substantially equal such that the arrangement of the plurality of cable strand positioning elements is symmetrical, as particularly shown in FIG. 1. In this exemplary embodiment, the predetermined angular distance PD is about 90 degrees.

The number of positioning elements shown in FIG. 1 should not be construed as limiting. Fewer or additional cable strand positioning elements may be integrally and monolithically attached to the hub 102. Accordingly, a predetermined angular distance PD will be in part based on the symmetrical positioning of the plurality of cable strand positioning elements such that the predetermined angular distance PD is equal to 360 divided by the total number N of cable strand positioning elements, where PD has a maximum value of 180 degrees and where:

$$PD=360/N.$$

Accordingly, where there are three (3) cable strand positioning elements, the predetermined angular distance will be about 120 degrees and where there are six (6) cable positioning elements, the predetermined angular distance PD will be about 60 degrees.

Each cable strand positioning element 106 includes a stabilizing portion 108, an arc portion 110, and a lobe 112, The stabilizing portion 108 has an innermost end 108a integrally and monolithically attached to the hub exterior 102e and an outermost end 108b integrally and monolithically attached to the lobe 112. Extending from the outermost end 108b is an arc portion 110. The arc portion 110 preferably has an arc thickness TA, a curved top 111 and a plurality of underside areas 109 with one or more of the plurality of underside areas being attached to the outermost end 108b of the stabilizing portion 108. The arc thickness TA varies based upon the curvature of the curved top 111.

The lobe 112 is monolithically formed with the hub, the stabilizing portion, the arc portion. The lobe 112 includes an outermost lobe end 112a, which preferably has a curved profile, and an innermost lobe end 112b. The innermost lobe end 112b is monolithically formed with the hub 102, as particularly shown in FIG. 2.

Referring to FIG. 2, the arc portion 110 and the lobe 112 may be further defined with respect to each other by an angular distance α, where α is measured from an edge 110e of the arc portion to a rear face 114r of the lobe 112.

Monolithically formed with the hub 102 and the lobe 112 is a plurality of strand anchors 120. Each strand anchor 120 includes an outermost end 120a and an innermost end 120b, with the outermost end 120a preferably being curved.

The lobe 112 and the strand anchor 120 may be further defined with respect to each other by an angular distance β, where β is measured from an edge 112e of the strand anchor to a forward face 114f of the lobe 112. The plurality of strand anchors 120 are also positioned symmetrically in a radial arrangement with respect to a longitudinal axis A, which extends through the center of the cable anchoring device. The number of strand anchors also preferably corresponds to the number of cable strand positioning elements.

Figure 3:
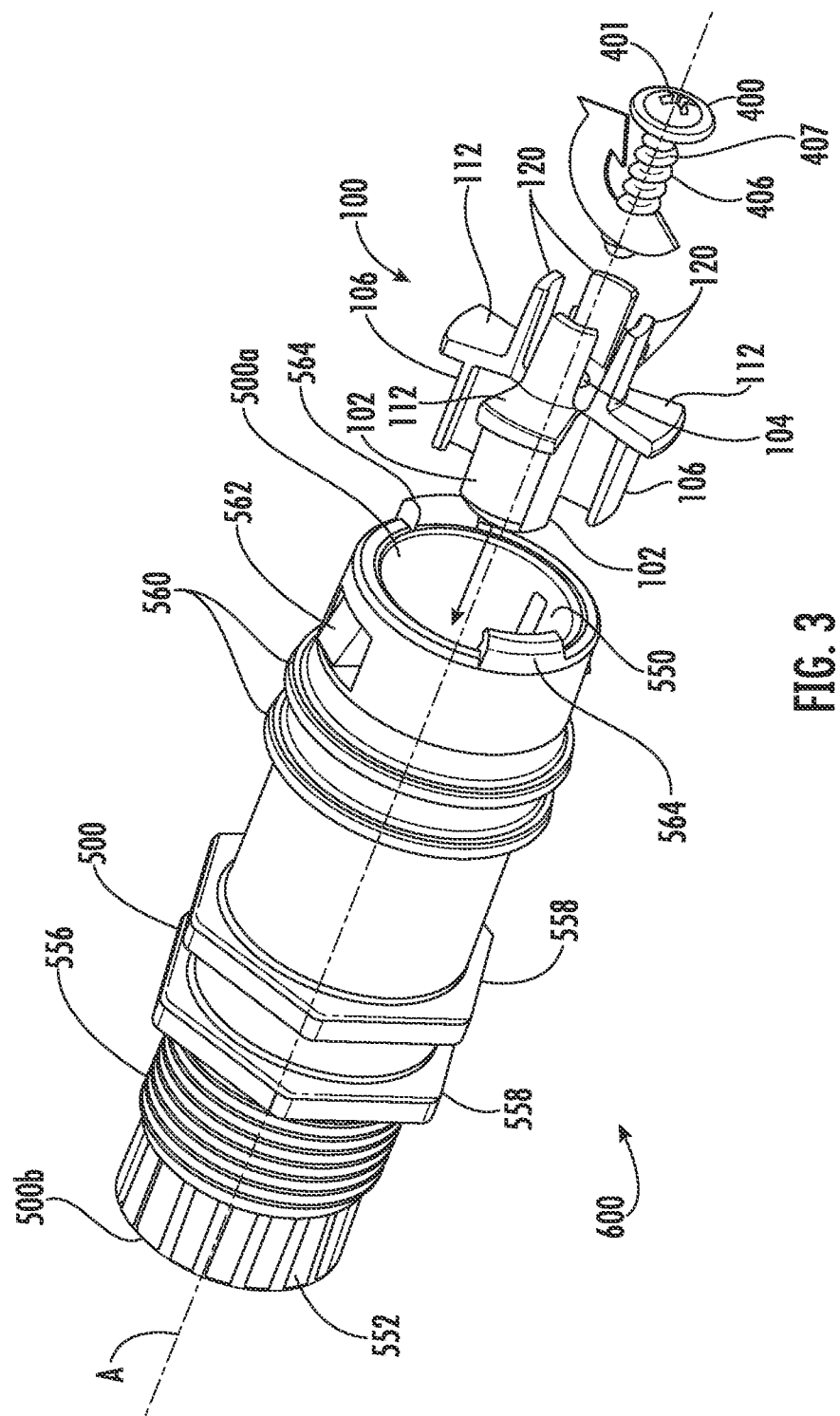
FIG. 3 is an exploded isometric view of a cable strand anchoring assembly, including the cable strand anchoring device shown in FIGS. 1 and 2, in accordance with embodiments disclosed herein.
Figure 4:
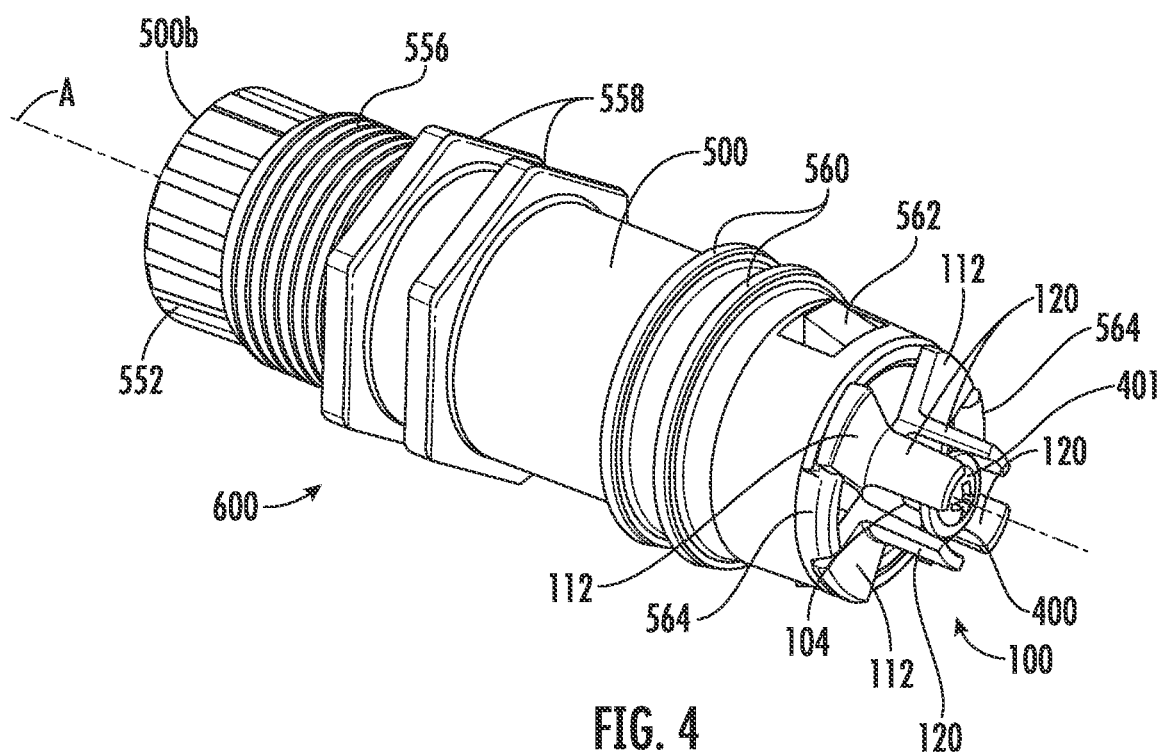
FIG. 4 is an assembled isometric view of the cable strand anchoring assembly shown in FIG. 3, in accordance with embodiments disclosed herein.

FIGS. 3 and 4 illustrate exploded and assembled views of a cable strand anchoring assembly 600, including the cable strand anchoring device 100 shown in FIGS. 1 and 2, and a modular component 500 configured for assembly with a telecommunications enclosures. Such modular components may be part of an external cable assembly such as the External Cable Assembly Module (ECAM) sold by Corning, Inc.

The modular component 500 has a bored end 500a, defined by an inner diameter 550, and a gripper end 500b. A portion of the outer surface of the modular component 500 includes a plurality of ribs 552 that facilitate hand gripping. The bored end 500a is configured to receive a portion of a cable strand anchoring device. When assembled with the cable strand anchoring device 100, as shown in FIGS. 1 and 2, the bored end 500a is configured to receive at least the hub 102 and the plurality of cable strand positioning elements 106. The outer surface of the modular component 500 also has fastening feature, configured as a plurality of threads 556, as well as a series of gripping elements 558, 560.

The modular component 500 also includes a plurality of tabs 554 extending axially outward from the bored end 550a. Each tab 554 is configured for positioning adjacent to a lobe 112, as particularly shown in FIG. 4.

FIGS. 3 and 4 additionally shows how a fastening element 400 may be coupled with the cable strand anchoring device 100. The fastening element 400 is configured as a screw, having a head 401 and a fastener body 406, having a plurality of fastener threads 407. The head 401 is positionable and capable of being centered within the plurality of strand anchors 120. The fastener body 406 is positionable in the thru-hole 104 of the cable strand anchoring device 100.

Figure 5:
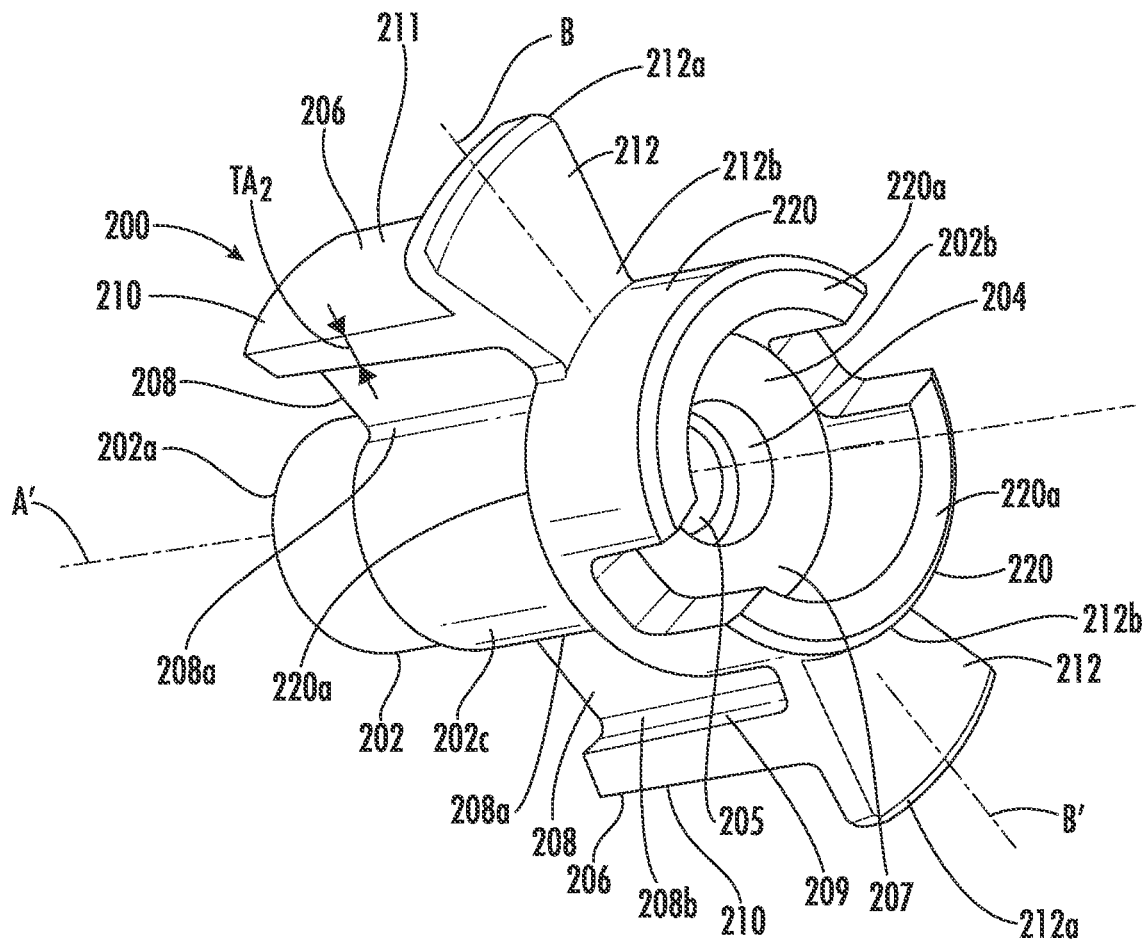
FIG. 5 is an isometric view of another cable strand anchoring device in accordance with embodiments disclosed herein.

FIG. 5 illustrates another embodiment of a cable strand anchoring device 200 configured for coupling to a telecommunications enclosure and/or one or more components of a telecommunications enclosure. As such, the cable strand anchoring device 200 can also be coupled to the modular component 500 shown in FIGS. 3 and 4. The cable strand anchoring device 200 includes a hub 202, extending from a first hub end 202a to a second hub end 202b.

Similar to the first embodiment, a thru-hole 204 is defined within the hub 202 to extend from the first hub end 202a to the second hub end 202b. The thru-hole 204 is configured for routing of at least one cable strand. However, alternatively or in addition, one or more cable strands may be routed around the hub exterior 202e. The thru-hole 204 may also be configured for assembly with a fastening element, as will be described with respect to FIGS. 3 and 4. The hub 202 is further defined by a plurality of hub walls, specifically a first hub wall 203 and a second hub wall 205. Each hub wall has respective hub wall thicknesses, where the second hub wall thickness is larger than the first hub wall thickness.

Extending outwardly from the hub 202 and specifically the hub exterior 202e is a plurality of a plurality of cable strand positioning elements 206. Each cable strand positioning element 206 is positioned symmetrically in a radial arrangement with respect to a longitudinal axis A', which extends through the center of the cable anchoring device. In the arrangement shown in FIG. 5, there are two cable strand positioning elements which are positioned symmetrically in a radial arrangement. Specifically, each cable strand positioning element has a central axis B, B' positioned a predetermined angular distance PD with respect to each other. Here, the predetermined angular distance PD is about 180 degrees.

Each cable strand positioning element 206 includes a stabilizing portion 208, an arc portion 210, and a lobe 212. The stabilizing portion 208 has an innermost end 208a integrally and monolithically attached to the hub exterior 202e and an outermost end 208b integrally and monolithically attached to the lobe 212. Extending from the outermost end 208b is the arc portion 210. The arc portion 210 preferably has an arc thickness TA2, a curved top 211 and a plurality of underside areas 209 with one or more of the plurality of underside areas being attached to the outermost end 208b of the stabilizing portion 208. The arc thickness TA varies based upon the curvature of the curved top 211.

The lobe 212 is monolithically formed with the hub, the stabilizing portion, the arc portion. The lobe 212 includes an outermost lobe end 212a, which preferably has a curved profile, and an innermost lobe end 212b. The innermost lobe end 212b is monolithically formed with the hub 202.

Monolithically formed with the hub 202 and the lobe 212 is a plurality of strand anchors 220. Each strand anchor 220 includes an outermost end 220a, with the outermost end 220a preferably having a curved profile. The plurality of strand anchors 220 are also positioned symmetrically in a radial arrangement with respect to a longitudinal axis A', which extends through the center of the cable anchoring device.

Figure 6:
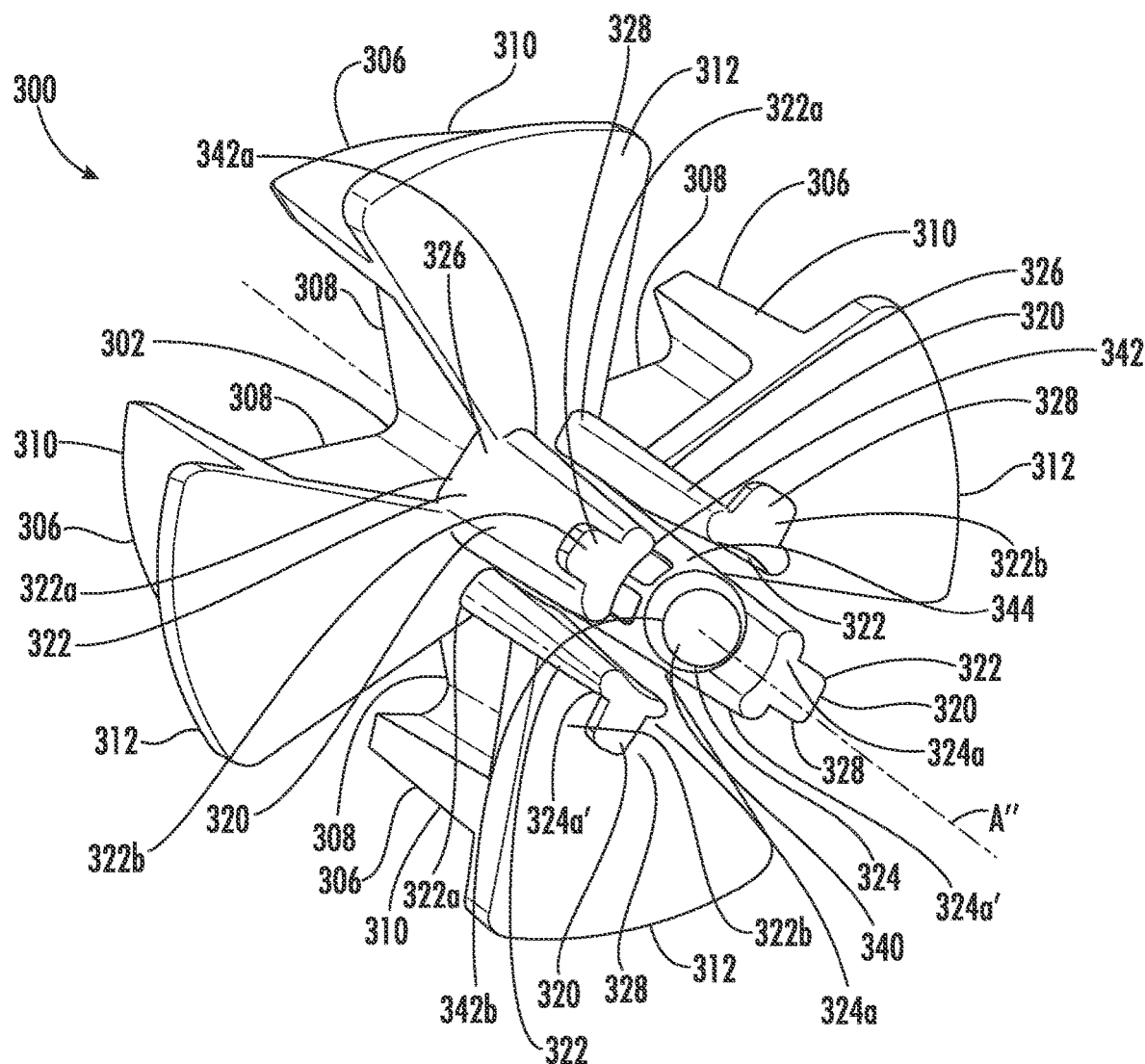
FIG. 6 is an isometric view of yet another cable strand anchoring device in accordance with embodiments disclosed herein.

FIG. 6 illustrates an alternative embodiment of a cable strand anchoring device 300 configured for coupling to a telecommunications enclosure and/or one or more components of a telecommunications enclosure such as the modular component 500, shown in FIGS. 3 and 4. The cable strand anchoring device 300 has the same configurations for a hub 302, and a plurality of cable strand positioning elements 306, as shown and described with respect to the first embodiment. Thus each cable strand positioning element includes a stabilizing portion 308, an arc portion 310, and a lobe 312. This embodiment of the cable strand anchoring devices includes alternatively formed strand anchors 320, having a strand gripping hub 340 positioned therein.

Monolithically formed with the hub 302 and the lobe 312 is a plurality of strand anchors 320. The plurality of strand anchors 320 is configured for receiving strands of a cable and/or a cable tie or other equivalent components capable of securing strands to the strand anchors. The plurality of strand anchors 320 is also positioned symmetrically in a radial arrangement with respect to a longitudinal axis A", which extends through the center of the cable anchoring device 300. Each strand anchor 320 includes an anchor body 322 having a first body end 322a, which is monolithically formed with the hub and a second body end 322b, which is cantilevered. The body additionally includes a plurality of side body portions 324 and a central anchor portion 326, having sections positioned between the side anchor portions and between two lobes 312. In this embodiment, the plurality of side body portions 324 includes a first body portion 324a and a second body portion 324a'. The strand anchor additionally includes a tab portion 328, extending radially outward with respect to longitudinal axis A". The tab portion 328 is configured to prevent slippage of cable strands, a cable tie, or another elements which may be positioned around the strand anchors 320.

Positioned centrally with respect to the plurality of strand anchors 320 is a strand gripping hub 340. The strand gripping hub 340 includes a gripping hub body 342, having a first hub body end 342a monolithically formed with the hub 302 and a cantilevered second hub body end 342b. The gipping hub body 342 also includes a plurality of ridges 344, which are configured to act as a gripping surface when cable strands are routed around the strand gripping hub 340.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A cable strand anchoring device, comprising:
   a hub extending from a first hub end to a second hub end;
   a plurality of cable strand positioning elements, extending from the hub, wherein each cable positioning element comprises:
      a stabilizing portion, having an innermost end and an outermost end, wherein the innermost end is integrally and monolithically formed with the hub,
      an arc portion, extending from the outermost end, monolithically formed with the stabilizing portion, and
      a lobe, having an outermost lobe end having a curved profile, monolithically formed with the hub, the stabilizing portion and the arc portion; and
   a plurality of strand anchors monolithically formed with the hub and the lobe, wherein the cable strand anchoring device is configured to receive strands of a cable.

2. The cable strand anchoring device of claim 1, wherein each of the plurality of cable strand positioning elements extend radially and symmetrically outward from the hub.

3. The cable strand anchoring device of claim 2, wherein the symmetrical positioning of the strand positioning element is defined by a predetermined angular distance, having a maximum of about 180 degrees.

4. The cable strand anchoring device of claim 1, wherein each of the plurality of strand anchors has an anchor edge positioned at an anchoring angle B with respect to a front face of the lobe.

5. The cable strand anchoring device of claim 1, wherein the positioning of the plurality of cable strand positioning elements is defined by predetermined angular distance, and wherein the predetermined angular distance equals 360 divided by the total number N of cable strand positioning elements.

6. The cable strand anchoring device of claim 1, wherein defined within the hub is a thru-hole that extends from the first hub end to the second hub end, and wherein the thru-hole is configured for routing of at least one cable strand.

7. The cable strand anchoring device of claim 6, wherein the thru-hole is configured to receive a fastening element.

8. The cable strand anchoring device of claim 1, wherein the hub comprises a plurality of hub walls.

9. The cable strand anchoring device of claim 1, wherein the lobe extends substantially perpendicular with respect to the stabilizing portion.

10. A cable strand anchoring assembly, comprising:
    a modular component having a fastening feature for attachment to a telecommunications enclosure;
    a cable strand anchoring device, comprising:
       a hub extending from a first hub end to a second hub end;
       a plurality of cable strand positioning elements, extending from the hub, wherein each cable positioning element comprises:
          a stabilizing portion, having an innermost end and an outermost end, wherein the innermost end is integrally and monolithically formed with the hub,
          an arc portion, extending from the outermost end, monolithically formed with the stabilizing portion, and
          a lobe, having an outermost lobe end having a curved profile, monolithically formed with the hub, the stabilizing portion and the arc portion; and
       a plurality of strand anchors monolithically formed with the hub and the lobe, wherein the cable strand anchoring assembly is configured to receive strands of a cable and a portion of the cable strand anchoring device and is operatively attachable to the telecommunications enclosure.

11. The cable strand anchoring assembly of claim 10, wherein the plurality of strand positioning elements extends radially and symmetrically outward from the hub.

12. The cable strand anchoring assembly of claim 10, wherein the symmetrical positioning of the strand positioning element is defined by a predetermined angular distance, having a maximum of about 180 degrees.

* * * * *